US007600521B2

(12) United States Patent
Woo

(10) Patent No.: US 7,600,521 B2
(45) Date of Patent: Oct. 13, 2009

(54) SYSTEM FOR AUTOMATICALLY EXCHANGING CLEANING TOOLS OF ROBOT CLEANER, AND METHOD THEREFOR

(75) Inventor: Chun-Kyu Woo, Kyungsangnam-Do (KR)

(73) Assignee: LG Electronics Inc., Seoul (KR)

( * ) Notice: Subject to any disclaimer, the term of this patent is extended or adjusted under 35 U.S.C. 154(b) by 702 days.

(21) Appl. No.: 11/200,180

(22) Filed: Aug. 10, 2005

(65) Prior Publication Data

US 2006/0060216 A1    Mar. 23, 2006

(30) Foreign Application Priority Data

Sep. 23, 2004   (KR) ...................... 10-2004-0076638

(51) Int. Cl.
*B08B 3/00* (2006.01)
(52) U.S. Cl. ...................... 134/57 R; 134/58 R; 134/59
(58) Field of Classification Search ............... 134/57 R, 134/58 R, 59, 18; 15/300.1; 318/568.12
See application file for complete search history.

(56) References Cited

U.S. PATENT DOCUMENTS

| 5,109,566 | A | * | 5/1992 | Kobayashi et al. ............ 15/319 |
| 5,959,423 | A | * | 9/1999 | Nakanishi et al. ...... 318/568.12 |
| 6,374,155 | B1 | | 4/2002 | Wallach et al. |

FOREIGN PATENT DOCUMENTS

WO    WO-01/82766 A2    11/2001

\* cited by examiner

*Primary Examiner*—Michael Kornakov
*Assistant Examiner*—Natasha Campbell
(74) *Attorney, Agent, or Firm*—Birch, Stewart, Kolasch & Birch, LLP

(57) ABSTRACT

The present invention discloses a system for automatically exchanging cleaning tools of a robot cleaner and a method therefor. The system for automatically exchanging the cleaning tools of the robot cleaner includes the robot cleaner for deciding whether a currently-mounted first cleaning tool is suitable for a bottom state of a cleaning area, and returning to and being docked on an exchange unit when the first cleaning tool is not suitable for the bottom state, and the exchange unit for exchanging the first cleaning tool currently mounted on the robot cleaner with a second cleaning tool suitable for the bottom state when the robot cleaner is docked.

6 Claims, 4 Drawing Sheets ically cleaning a specific area by running in a house (for example, a living room, a main room, etc.) and sucking foreign substances such as dust from the bottom without operations of the user.

SYSTEM FOR AUTOMATICALLY EXCHANGING CLEANING TOOLS OF ROBOT CLEANER, AND METHOD THEREFOR

BACKGROUND OF THE INVENTION

1. Field of the Invention

The present invention relates to a robot cleaner, and more particularly to, a system for automatically exchanging cleaning tools of a robot cleaner which can automatically exchange the cleaning tools of the robot cleaner, and a method therefor.

2. Description of the Background Art

In general, a robot cleaner is an apparatus for automatically cleaning a specific area by running in a house (for example, a living room, a main room, etc.) and sucking foreign substances such as dust from the bottom without operations of the user.

The robot cleaner runs in a preset cleaning path and performs a cleaning operation according to a built-in program. A plurality of sensors are used to sense a position of the robot cleaner, a running distance of the robot cleaner and obstacles near the robot cleaner, so that the robot cleaner can automatically run in the preset path and perform the cleaning operation.

However, because the high-priced sensors are installed in the robot cleaner so that the robot cleaner can precisely run in the preset path and perform the cleaning operation, the inside structure of the robot cleaner is complicated and the prime cost of production is increased.

In order to solve the above problem, there has been suggested a robot cleaner which randomly runs in a predetermined cleaning path and performs a cleaning operation.

FIG. 1 is a block diagram illustrating a running device of a conventional robot cleaner.

Referring to FIG. 1, the running device of the conventional robot cleaner includes an obstacle sensing unit 1 for sensing an obstacle when the robot cleaner goes straight in a predetermined area and runs against the obstacle, a control unit 2 for sopping running of the robot cleaner according to the output signal from the obstacle sensing unit 1, generating a random angle according to a random method, and rotating the robot cleaner by applying the random angle as a rotary angle of the robot cleaner, a left wheel motor driving unit 3 for driving a left wheel motor 5 of the robot cleaner at a predetermined speed according to the control signal from the control unit 2, and a right wheel motor driving unit 4 for driving a right wheel motor 6 of the robot cleaner at a predetermined speed according to the control signal from the control unit 2.

The operation of the conventional robot cleaner will now be explained with reference to FIG. 2.

As illustrated in FIG. 2, the running method for the conventional robot cleaner includes the steps of, when a cleaning command is inputted by the user, making the robot cleaner go straight and sensing an obstacle (S1 to S3), when the obstacle is sensed, stopping the robot cleaner and generating a random angle according to a random method (S4), applying the random angle as a rotary angle of the robot cleaner and rotating the robot cleaner by the rotary angle (S5), making the rotated robot cleaner go straight (S6), and deciding completion of the cleaning operation of the robot cleaner while the robot cleaner goes straight and stopping running of the robot cleaner when the robot cleaner completes the cleaning operation.

The running method for the conventional robot cleaner will now be described in more detail.

When the cleaning command for the robot cleaner is inputted by the user (S1), the control unit 2 outputs the control signal for equalizing a driving speed of the left wheel motor 5 with a driving speed of the right wheel motor 6, so that the robot cleaner can go straight.

The left wheel motor driving unit 3 drives the left wheel motor 5 according to the control signal, and the right wheel motor driving unit 4 drives the right wheel motor 6 according to the control signal. Therefore, the robot cleaner goes straight by the left wheel motor 5 and the right wheel motor 6 (S2).

While the robot cleaner goes straight, if the robot cleaner runs against an obstacle, the obstacle sensing unit 1 senses the obstacle by an impact, and transmits an obstacle sensing signal to the control unit 2 (S3).

Accordingly, the control unit 2 stops running of the robot cleaner according to the obstacle sensing signal, generates the random angle according to the random method (S4), and outputs the control signal for applying the random angle as the rotary angle of the robot cleaner. Here, the control unit 2 outputs the control signals for making the speed of the left wheel motor 5 different from the speed of the right wheel motor 6 to the left wheel motor driving unit 3 and the right wheel motor driving unit 4, so that the robot cleaner can be rotated by the rotary angle.

The left wheel motor driving unit 3 drives the left wheel motor 5 according to the control signal from the control unit 2, and the right wheel motor driving unit 4 drives the right wheel motor 6 according to the control signal from the control unit 2. As a result, the robot cleaner is rotated by the random angle (S5).

Thereafter, the control unit 2 outputs the control signals for equalizing the speed of the left wheel motor 5 with the speed of the right wheel motor 6 to the left wheel motor driving unit 3 and the right wheel motor driving unit 4. Thus, the robot cleaner goes straight (S6).

While the robot cleaner goes straight, completion of the cleaning operation of the robot cleaner is decided. When the cleaning operation is completed, running of the robot cleaner is stopped and the cleaning operation is ended. When the cleaning operation of the robot cleaner is not completed, the routine goes back to the step for sensing the obstacle, to repeat the above procedure.

However, the conventional robot cleaner has a disadvantage in that the user must examine the bottom state of the cleaning area of the robot cleaner and exchange the current cleaning tool with the cleaning tool suitable for the bottom state. Accordingly, the conventional robot cleaner reduces conveniences of the user. Moreover, when the user mistakenly recognizes the bottom state of the cleaning area, the conventional robot cleaner cannot efficiently clean the cleaning area.

SUMMARY OF THE INVENTION

Therefore, an object of the present invention is to provide a system for automatically exchanging cleaning tools of a robot cleaner which can prevent the user from inconveniently exchanging the cleaning tools in person by automatically exchanging the cleaning tools, and a method therefor.

Another object of the present invention is to provide a system for automatically exchanging cleaning tools of a robot cleaner which can reduce the volume and weight of the robot cleaner that increase by various cleaning tools installed in the robot cleaner, by exchanging the cleaning tools by using a charging unit for charging the robot cleaner, and a method therefor.

To achieve these and other advantages and in accordance with the purpose of the present invention, as embodied and broadly described herein, there is provided a system for automatically exchanging cleaning tools of a robot cleaner, including: the robot cleaner for deciding whether a currently-mounted first cleaning tool is suitable for a bottom state of a cleaning area, and returning to and being docked on an exchange unit when the first cleaning tool is not suitable for the bottom state; and the exchange unit for exchanging the first cleaning tool currently mounted on the robot cleaner with a second cleaning tool suitable for the bottom state when the robot cleaner is docked.

According to another aspect of the present invention, in a robot cleaner having a self-control running function, a method for automatically exchanging cleaning tools of the robot cleaner includes the steps of: detecting a bottom state of a cleaning area during a cleaning operation; deciding whether a currently-mounted first cleaning tool is suitable for the detected bottom state, and returning and docking the robot cleaner on an exchange unit when the first cleaning tool is not suitable for the bottom state; and exchanging, on the exchange unit, the first cleaning tool mounted on the robot cleaner with a second cleaning tool suitable for the detected bottom state.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

A system for automatically exchanging cleaning tools of a robot cleaner and a method therefor which can prevent the user from inconveniently exchanging the cleaning tools in person and reduce the volume and weight of the robot cleaner that increase by various cleaning tools installed in the robot cleaner, by automatically exchanging the cleaning tools by using a charging unit for charging the robot cleaner will now be described in detail with reference to FIGS. 3 to 5.

Figure 1:
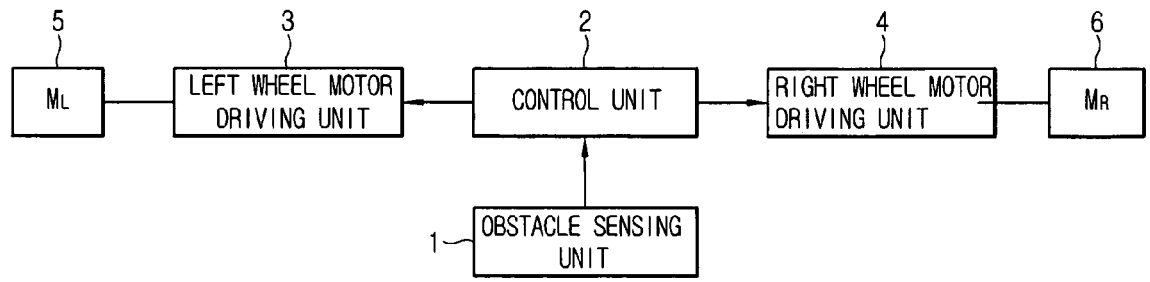
FIG. 1 is a block diagram illustrating a running device of a conventional robot cleaner.
Figure 2:
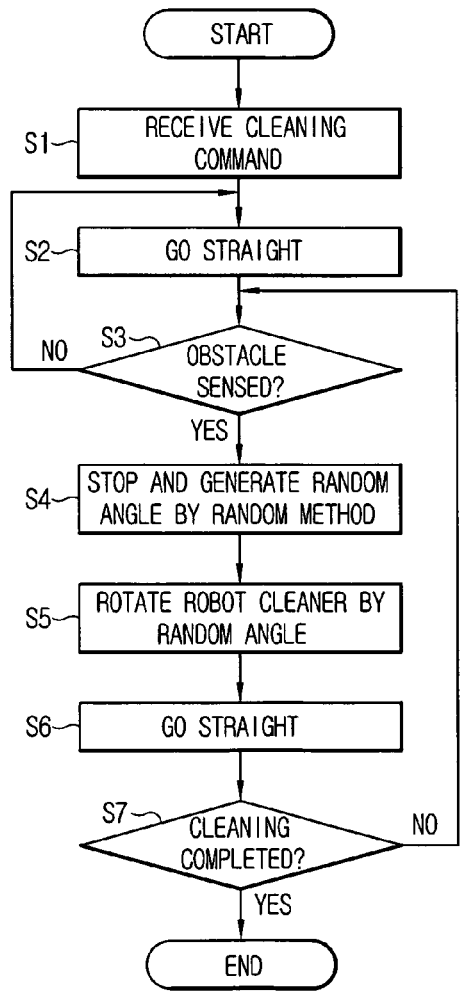
FIG. 2 is a flowchart showing sequential steps of the running method for the conventional robot cleaner.
Figure 3:
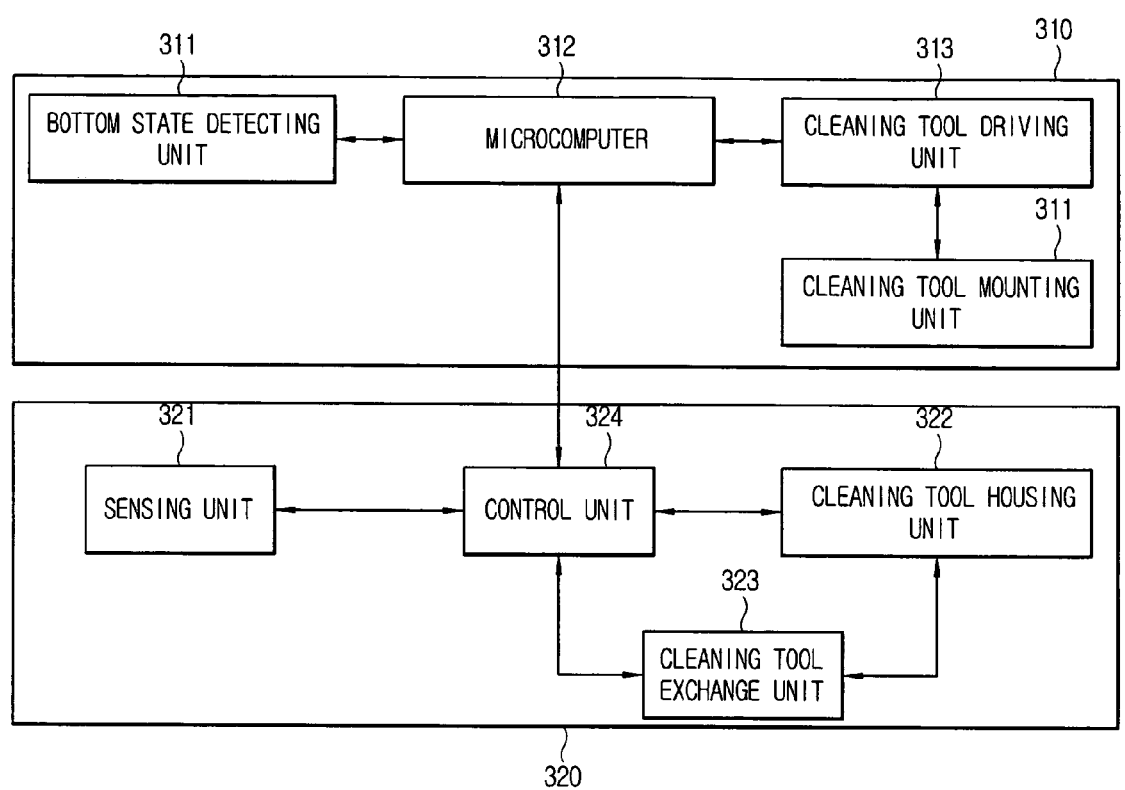
FIG. 3 is a block diagram illustrating a system for automatically exchanging cleaning tools of a robot cleaner in accordance with the present invention.

FIG. 3 is a block diagram illustrating the system for automatically exchanging the cleaning tools of the robot cleaner in accordance with the present invention.

As shown in FIG. 3, the system for automatically exchanging the cleaning tools of the robot cleaner includes the robot cleaner 310 for deciding whether a currently-mounted first cleaning tool is suitable for a bottom state of a cleaning area, and returning to and being docked on an exchange unit 320 when the first cleaning tool is not suitable for the bottom state, and the exchange unit 320 for exchanging the first cleaning tool currently mounted on the robot cleaner 310 with a second cleaning tool suitable for the bottom state when the robot cleaner 310 is docked. Here, the robot cleaner 310 further includes an input unit (not shown) for receiving an input signal relating to a cleaning method selected by the user. The exchange unit 320 exchanges the first cleaning tool with the second cleaning tool suitable for the selected cleaning method.

The system for automatically exchanging the cleaning tools of the robot cleaner in accordance with the present invention will now be described in detail.

The robot cleaner 310 is comprised of a bottom state detecting unit 311 for detecting the bottom state of the cleaning area, a microcomputer 312 for switching the mode of the robot cleaner 310 into a cleaning tool exchange mode according to the detection result of the bottom state detecting unit 311 and transmitting the bottom state information to the exchange unit 320, a cleaning tool mounting unit 314 on which the cleaning tools are mounted, and a cleaning tool driving unit 313 for driving the mounted cleaning tool. Here, the microcomputer 312 can receive the input signal relating to the cleaning method selected by the user through the input unit (not shown). Exemplary bottom states detected by the bottom state detecting unit 311 include a hard floor, a carpet, moisture and grease spots. Various methods for detecting the bottom state by the bottom state detecting unit 311 have been publicly known, and thus explanations thereof are omitted.

The microcomputer 312 transmits the bottom state information to the exchange unit 320 by RF communication or infrared communication. In addition, the microcomputer 312 can transmit the selected cleaning method information to the exchange unit 320 by RF communication or infrared communication.

The exchange unit 320 includes a sensing unit 321 for sensing the position and direction of the robot cleaner 310 and the exchange unit 320, a cleaning tool housing unit 322 for housing various cleaning tools, a cleaning tool exchange unit 323 for exchanging the first cleaning tool currently mounted on the robot cleaner 310 with the second cleaning tool selected among the cleaning tools housed in the cleaning tool housing unit 322, and a control unit 324 for selecting the second cleaning tool among the various cleaning tools housed in the cleaning tool housing unit 322 on the basis of the bottom state information detected by the robot cleaner 310, and docking the exchange unit 320 and the robot cleaner 310 according to the sensing signal from the sensing unit 321. Here, the control unit 324 can select the second cleaning tool among the various cleaning tools housed in the cleaning tool housing unit 322 on the basis of the selected cleaning method information. A method for exchanging the first cleaning tool with the second cleaning tool can be a method for exchanging tools of an auto tool changer (ATC) of a CNC lathe. Exemplary cleaning tools include a rubber blade tool, a mop tool, a rough brush tool and a steam tool.

The operation of the system for automatically exchanging the cleaning tools of the robot cleaner in accordance with the present invention will now be described in detail with reference to FIG. 4.

Figure 4:
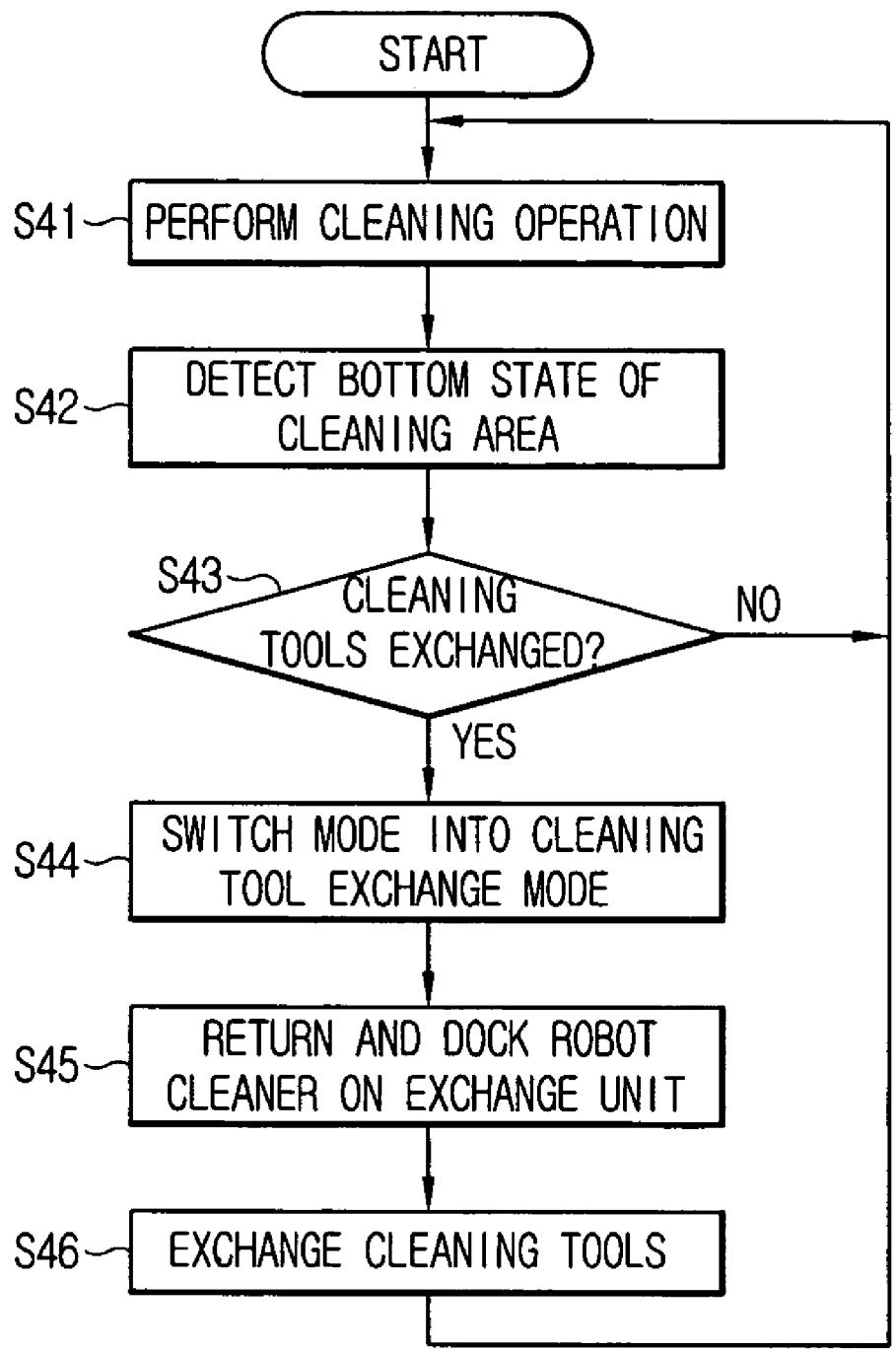
FIG. 4 is a flowchart showing sequential steps of a method for automatically exchanging cleaning tools of a robot cleaner in accordance with the present invention.

FIG. 4 is a flowchart showing sequential steps of the method for automatically exchanging the cleaning tools of the robot cleaner in accordance with the present invention.

As illustrated in FIG. 4, in the robot cleaner having a self-control running function, the method for automatically exchanging the cleaning tools of the robot cleaner includes the steps of performing the cleaning operation (S41), detecting the bottom state of the cleaning area during the cleaning operation (S42), deciding whether the currently-mounted first cleaning tool is suitable for the detected bottom state (S43), switching the mode of the robot cleaner into the cleaning tool exchange mode when the first cleaning tool is not suitable for the bottom state (S44), returning and docking the robot cleaner entering into the cleaning tool exchange mode on the exchange unit (S45), and exchanging, on the exchange unit, the first cleaning tool mounted on the robot cleaner with the second cleaning tool suitable for the detected bottom state (S46). Here, the detecting step (S42) further includes a step for receiving the input signal relating to the cleaning method selected by the user, the deciding step (S43) further includes a step for deciding whether the first cleaning tool is suitable for the cleaning method selected by the user, and the exchange step (S46) further includes a step for exchanging the first cleaning tool mounted on the robot cleaner with the second cleaning tool suitable for the cleaning method selected by the user.

The operation of the system for automatically exchanging the cleaning tools of the robot cleaner in accordance with the present invention will now be described in more detail.

The robot cleaner 310 performs the bottom cleaning operation by using the special cleaning tool (first cleaning tool) previously mounted on the cleaning tool mounting unit 314 (S41).

While the robot cleaner 310 performs the bottom cleaning operation (S41), the bottom state detecting unit 311 of the robot cleaner 310 detects the bottom state of the cleaning area (S42). The bottom state detecting unit 311 transmits the bottom state information to the microcomputer 312, and the input unit (not shown) transmits the input signal relating to the cleaning method to the microcomputer 312. Here, the robot cleaner 310 further performs the input step for receiving the input signal relating to the cleaning method selected by the user. Exemplary bottom states include a hard floor, a carpet, moisture and grease spots. Various methods for detecting the bottom state (S42) have been publicly known, and thus explanations thereof are omitted.

Accordingly, the microcomputer 312 analyzes the bottom state information from the bottom state detecting unit 311 or the selected cleaning method information, and decides whether the first cleaning tool mounted on the robot cleaner 310 needs to be exchanged on the basis of the analysis result (S43).

When the first cleaning tool mounted on the robot cleaner 310 needs to be exchanged, the robot cleaner 310 stops the cleaning operation and enters into the cleaning tool exchange mode (S44).

The robot cleaner 310 entering into the cleaning tool exchange mode returns to the exchange unit 320, and is docked on the exchange unit 320 (S45). Here, the exchange unit 320 can be formed on a charging unit for charging the robot cleaner 310. On the other hand, a method for returning the robot cleaner 310 to a special position (the exchange unit 320 or the charging unit) and a device therefor have been publicly known, and thus explanations thereof are omitted.

When the robot cleaner 310 is docked on the exchange unit 320 (S45), the microcomputer 312 transmits the bottom state information or the selected cleaning method information to the control unit 324 of the exchange unit 320. The bottom state information or the selected cleaning method information can be transmitted to the control unit 324 of the exchange unit 320 by RF communication or infrared communication. In addition, the bottom state information or the selected cleaning method information can be transmitted before the robot cleaner 310 is docked on the exchange unit 320.

The control unit 324 of the exchange unit 320 selects the second cleaning tool among the various cleaning tools housed in the cleaning tool housing unit 323 on the basis of the information from the robot cleaner 310. The control unit 324 disconnects the first cleaning tool mounted on the cleaning tool mounting unit 314 of the docked robot cleaner 310 from the robot cleaner 310, and mounts the second cleaning tool on the cleaning tool mounting unit 314 of the robot cleaner 310. The control unit 324 transfers the disconnected first cleaning tool to the cleaning tool housing unit 322.

The microcomputer 312 of the robot cleaner 310 connects the second cleaning tool mounted on the cleaning tool mounting unit 314 of the robot cleaner 310 to the cleaning tool driving unit 313 of the robot cleaner 310.

Thereafter, the robot cleaner 310 on which the second cleaning tool has been mounted resumes the cleaning operation by using the second cleaning tool connected to the cleaning tool driving unit 313.

Figure 5:
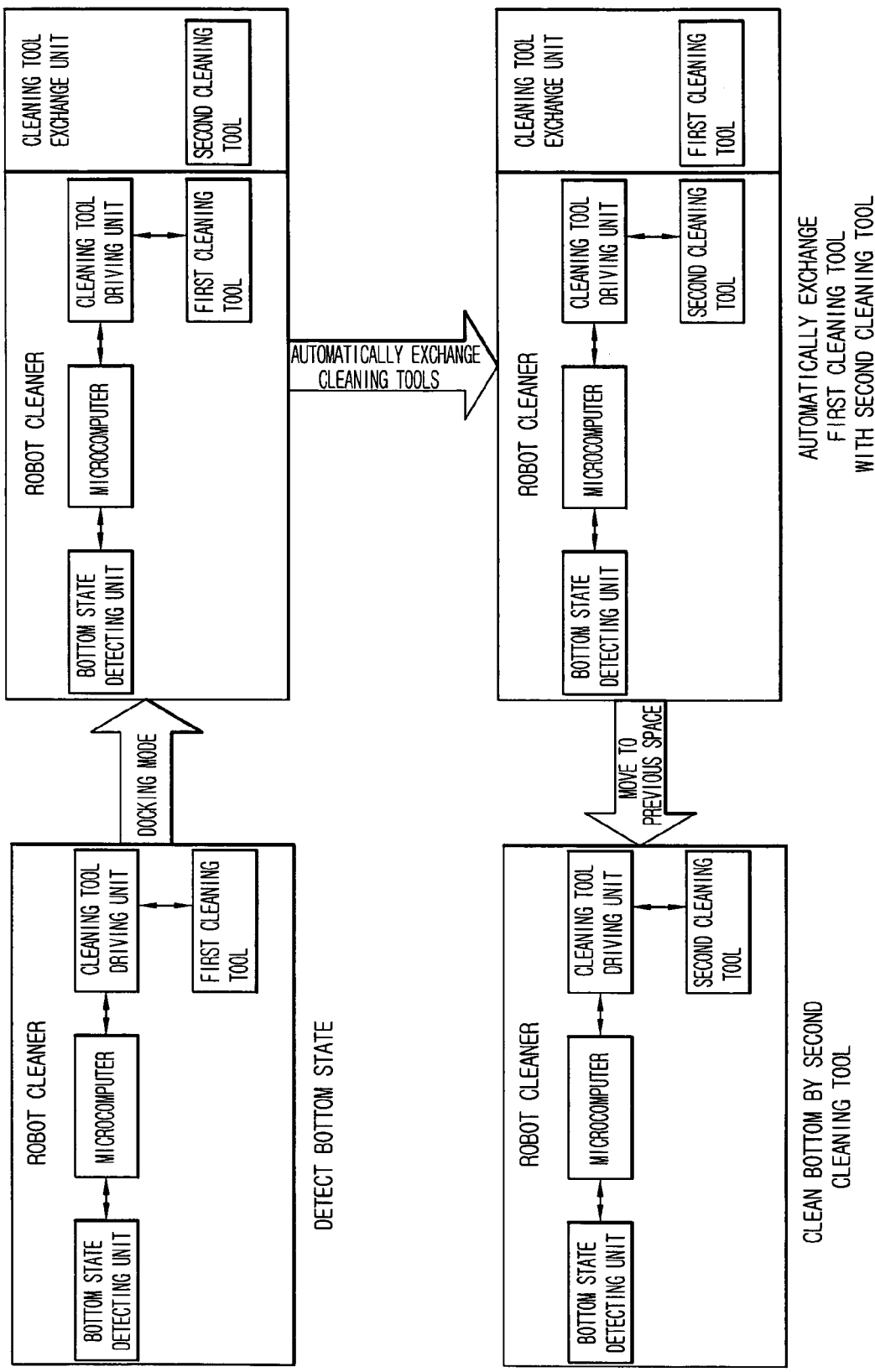
FIG. 5 is a schematic diagram illustrating the process for automatically exchanging the cleaning tools of the robot cleaner in accordance with the present invention.

FIG. 5 is a schematic diagram illustrating the process for automatically exchanging the cleaning tools of the robot cleaner in accordance with the present invention.

As depicted in FIG. 5, the bottom state of the cleaning area is detected by the bottom state detecting unit adhered to the robot cleaner, the second cleaning tool is selected according to the detection result, and the currently-mounted first cleaning tool is automatically exchanged with the second cleaning tool on the exchange unit.

As discussed earlier, in accordance with the present invention, the system for automatically exchanging the cleaning tools of the robot cleaner and the method therefor can prevent the user from inconveniently exchanging the cleaning tools in person and reduce the volume and weight of the robot cleaner that increase by various cleaning tools installed in the robot cleaner, by automatically exchanging the cleaning tools by using the charging unit for charging the robot cleaner.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A system for automatically exchanging cleaning tools of a robot cleaner, comprising:

the robot cleaner for detecting a bottom state of the cleaning area, deciding whether a currently-mounted first cleaning tool is suitable for the detected bottom state of the cleaning area, and returning to and being docked on an exchange unit when the first cleaning tool is not suitable for the bottom state;

wherein the robot cleaner comprises: a cleaning tool mounting unit on which the cleaning tools are mounted; a bottom state detecting unit for detecting the bottom state of the cleaning area; and a microcomputer for switching the mode of the robot cleaner into a cleaning tool exchange mode according to the detection result of the bottom state detecting unit, and transmitting the detected information to the exchange unit the exchange unit for exchanging the first cleaning tool currently mounted on the robot cleaner with a second cleaning tool suitable for the bottom state when the robot cleaner is docked.

2. The system of claim 1, wherein the robot cleaner further comprises a cleaning tool driving unit for connecting or disconnecting the cleaning tool to/from the robot cleaner according to the control signal from the microcomputer.

3. The system of claim 1 or claim 2, wherein the exchange unit is formed on a charging unit for charging the robot cleaner.

4. The system of claim 1, wherein the exchange unit comprises:

a sensing unit for sensing the position and direction of the robot cleaner with respect to the exchange unit;

a cleaning tool housing unit for housing various cleaning tools;

a cleaning tool exchange unit for exchanging the first cleaning tool currently mounted on the robot cleaner with the second cleaning tool selected among the various cleaning tools housed in the cleaning tool housing unit; and a control unit for selecting the second cleaning tool among the various cleaning tools on the basis of the bottom state detected by the robot cleaner, and docking the exchange unit and the robot cleaner according to the sensing signal from the sensing unit.

5. A system for automatically exchanging cleaning tools of a robot cleaner, comprising:

the robot cleaner comprising:

a bottom tool mounting unit on which the cleaning tools are mounted;

an input unit for receiving an input signal relating to a cleaning method selected by the user; and a microcomputer for switching the mode of the robot cleaner into a cleaning tool exchange mode on the basis of the inputted cleaning method, and transmitting the selected cleaning method information; and an exchange unit comprising:

a sensing unit for sensing the position and direction of the robot cleaner with respect to the exchange unit;

a cleaning tool housing unit for housing various cleaning tools;

a cleaning tool exchange unit for exchanging a first cleaning tool currently mounted on the robot cleaner with a second cleaning tool selected among the various cleaning tools housed in the cleaning tool housing unit; and a control unit for selecting the second cleaning tool among the various cleaning tools housed in the cleaning tool housing unit on the basis of the selected cleaning method information, and docking the exchange unit and the robot cleaner according to the sensing signal from the sensing unit.

6. The system of claim 5, wherein the exchange unit is formed on a charging unit for charging the robot cleaner.

* * * * *